United States Patent
Isomura et al.

(10) Patent No.: US 7,717,272 B2
(45) Date of Patent: May 18, 2010

(54) CERAMIC POROUS MEMBRANE AND CERAMIC FILTER

(75) Inventors: Manabu Isomura, Tsushima (JP); Tatsuya Hishiki, Nagoya (JP); Ichiro Wada, Kariya (JP)

(73) Assignee: NGK Insulators, Ltd., Nagoya (JP)

( * ) Notice: Subject to any disclaimer, the term of this patent is extended or adjusted under 35 U.S.C. 154(b) by 13 days.

(21) Appl. No.: 11/850,692

(22) Filed: Sep. 6, 2007

(65) Prior Publication Data
US 2008/0093290 A1    Apr. 24, 2008

(30) Foreign Application Priority Data
Oct. 18, 2006    (JP)    ............... 2006-284397

(51) Int. Cl.
*B01D 71/02* (2006.01)
*B01D 61/001* (2006.01)

(52) U.S. Cl. .................. 210/500.25; 210/503
(58) Field of Classification Search ........... 210/510
See application file for complete search history.

(56) References Cited

U.S. PATENT DOCUMENTS

| | | | |
|---|---|---|---|
| 4,711,719 A | | 12/1987 | Leenaars et al. |
| 4,719,058 A | | 1/1988 | Komoda |
| 5,186,833 A | * | 2/1993 | Mchenry et al. ....... 210/321.75 |
| 5,194,200 A | * | 3/1993 | Anderson et al. ....... 210/510.1 |
| 2001/0001453 A1 | | 5/2001 | Thoraval |
| 2004/0071894 A1 | | 4/2004 | Lee et al. |

FOREIGN PATENT DOCUMENTS

| | | |
|---|---|---|
| EP | 0 327 687 A2 | 8/1989 |
| JP | 61-238315 | 10/1986 |
| JP | 03-267129 | 11/1991 |

OTHER PUBLICATIONS

Andre et al., "New Inorganic Ultrafiltration Membranes: Titania and Zirconia Membranes", Journal of American Ceramic Society 72 [2] 257-61 (1989).*

Anderson et al., "Titania and Alumina Ceramic Membranes", Journal of Membrane Science 39 (1988) 243-258.*

* cited by examiner

*Primary Examiner*—Krishnan S Menon
(74) *Attorney, Agent, or Firm*—Burr & Brown

(57) ABSTRACT

There are disclosed a ceramic porous membrane formed with less membrane formation times and having less defects, a small and uniform thickness and a high resolution, and a ceramic filter. A silica membrane as a ceramic porous membrane is formed on a titania UF membrane as an ultrafiltration membrane (a UF membrane) formed on a porous base member which is a microfiltration membrane (also referred to as an MF membrane) and having an average pore diameter smaller than that of the porous base member, the silica membrane has an average pore diameter smaller than that of the titania UF membrane and a part of the silica membrane permeates the titania UF membrane.

6 Claims, 7 Drawing Sheets

US 7,717,272 B2

CERAMIC POROUS MEMBRANE AND CERAMIC FILTER

BACKGROUND OF THE INVENTION AND RELATED ART

The present invention relates to a ceramic porous membrane and a ceramic filter. More particularly, it relates to a ceramic porous membrane having less defects and having a small and uniform thickness, and a ceramic filter.

Heretofore, various methods of forming a ceramic porous membrane on a porous base member have been known. For example, a hot coating process is known (see Non-Patent Document 1). This is a method of rubbing a tube base with cloth containing a silica sol to apply the silica sol and thereby form a porous membrane on an outer surface of the heated tube base.

A method of forming a porous membrane on an inner surface of a porous base member having a tubular shape or a cylindrical lotus-root-like monolith shape by filtering membrane formation is also known (see Patent Documents 1, 2). The outer surface of the porous base member is held at a pressure lower than that of an inner surface thereof which comes in contact with a sol liquid to form the membrane on the inner surface of the porous base member.

[Patent Document 1] Japanese Patent Application Laid-Open No. 3-267129

[Patent Document 2] Japanese Patent Application Laid-Open No. 61-238315

[Non-Patent Document 1] Journal of Membrane Science 149 (1988) 127 to 135

However, the hot coating process has a problem that the membrane cannot uniformly be formed on the whole base surface, and the membrane can be formed on the only outer surface of the tube base. The process cannot be applied to any monolith-type base. On the other hand, in the filtering membrane formation process, during drying of the formed membrane, a solvent present in base pores sometimes flows out on a membrane side to cause membrane peeling. As a result, there is a problem that a defect is generated in the porous membrane formed on the fired base surface. A dip coating process can be applied to the monolith type base, but the number of membrane formation times is large.

An object of the present invention is to provide a ceramic porous membrane formed with less membrane formation times and having less defects, a small and uniform thickness and a high resolution, and a ceramic filter.

SUMMARY OF THE INVENTION

The present inventors have found that the above-mentioned object can be achieved using a constitution in which the ceramic porous membrane is formed on an ultrafiltration membrane so as to partially permeate pores of the ultrafiltration membrane. That is, according to the present invention, the following ceramic porous membrane and ceramic filter are provided.

[1] A ceramic porous membrane which is formed on an ultrafiltration membrane having an average pore diameter of 2 to 20 nm and which partially permeates pores of the ultrafiltration membrane.

[2] The ceramic porous membrane according to the above [1], wherein a permeation depth in the ultrafiltration membrane is ½ or more of a thickness of the ultrafiltration membrane from the outermost surface of the ultrafiltration membrane.

[3] The ceramic porous membrane according to the above [1] or [2], wherein the ultrafiltration membrane is a titania membrane.

[4] The ceramic porous membrane according to any one of the above [1] to [3], which is a silica membrane.

[5] The ceramic porous membrane according to any one of the above [1] to [4], wherein a ceramic sol permeates the ultrafiltration membrane to solidify.

[6] A ceramic filter comprising: a porous base member; an ultrafiltration membrane formed on the porous base member and having an average pore diameter of 2 to 20 nm; and a ceramic porous membrane which is formed on the ultrafiltration membrane and which partially permeates pores of the ultrafiltration membrane.

[7] The ceramic filter according to the above [6], wherein a permeation depth of the ceramic porous membrane in the ultrafiltration membrane is ½ or more of a thickness of the ultrafiltration membrane from the outermost surface of the ultrafiltration membrane.

[8] The ceramic filter according to the above [6] or [7], wherein the ultrafiltration membrane is a titania membrane.

[9] The ceramic filter according to any one of the above [6] to [8], wherein the ceramic porous membrane is a silica membrane.

[10] The ceramic filter according to any one of the above [6] to [9], wherein the ceramic porous membrane is formed by allowing a ceramic sol to permeate the ultrafiltration membrane and solidify.

The thin ceramic porous membrane having less defects can be formed using a constitution of the ceramic porous membrane which is formed on the ultrafiltration membrane having an average pore diameter of 2 to 20 nm and which partially permeates the pores of the ultrafiltration membrane. According to a structure in which a part of the ceramic porous membrane infiltrates the ultrafiltration membrane, influences of an uneven surface of a porous base member are reduced, and the ceramic porous membrane having less defects and having a dehydrating function with a high resolution can be obtained. Furthermore, when such a structure is used, the ceramic porous membrane having a high performance can be obtained with reduced costs. When the silica membrane is used as the ceramic porous membrane, the membrane is especially preferable for an application of dehydration of alcohol such as ethanol or isopropyl alcohol or an organic acid such as acetic acid.

DESCRIPTION OF THE REFERENCE NUMERALS

1: silica membrane, 10: ceramic filter, 11: porous base member, 14: titania UF membrane, 22: partition wall, 23: cell, 25: inlet-side end surface, 40: coating liquid (silica sol liquid), 41: masking tape, 51: foreign matter, 52: hole.

DESCRIPTION OF THE PREFERRED EMBODIMENTS

An embodiment of the present invention will hereinafter be described with reference to the drawings. The present invention is not limited to the following embodiment, can be changed, modified or improved without departing from the scope of the present invention.

Figure 1:
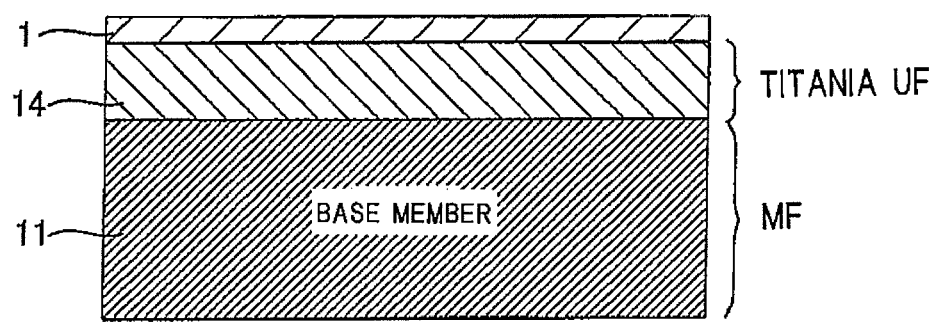
FIG. 1 is a sectional view of a ceramic filter according to one embodiment of the present invention.

FIG. 1 shows a silica membrane 1 which is a ceramic porous membrane of the present invention. The silica membrane 1 is formed on a titania UF membrane 14 which is an ultrafiltration membrane (also referred to as the UF membrane) formed on a porous base member 11 as a microfiltration membrane (also referred to as the MF membrane) and having an average pore diameter smaller than that of the porous base member 11. The silica membrane has an average pore diameter smaller than that of the titania UF membrane 14, and a part of the silica membrane permeates the titania UF membrane.

It is preferable that the porous base member 11 is the microfiltration membrane (the MF membrane) having pore diameters of about 0.1 to 0.6 μm at an outermost layer.

Moreover, the titania UF membrane 14 which is an ultrafiltration membrane having pore diameters of about 2 to 20 nm (preferably about 8 nm) is formed on the microfiltration membrane (the MF membrane) 11, and the silica membrane 1 is formed on the titania UF membrane 14. It is assumed that the silica membrane 1 has an infiltration structure to infiltrate the titania UF membrane 14. In other words, a part of silica forming the silica membrane 1 permeates the titania UF membrane 14. Here, when silica permeates the titania UF membrane 14, it is indicated according to EDX element analysis that a portion having a silica/titania oxide weight ratio of 0.2 or more has a thickness of ½ or more of that of the UF membrane from the outermost surface of the UF membrane. It is assumed that the silica/titania oxide weight ratio is an average value of ten measurements of spot analysis based on the EDX element analysis.

In a case where the silica membrane 1 is formed on the titania UF membrane 14 having pore diameters of about 2 to 20 nm as described above, when a membrane surface of the titania UF membrane 14 is smooth and has less defects, the silica membrane 1 can be formed to be thin without any defect. That is, the silica membrane 1 having a high separability and a high flux (a transmitted and filtered flux) can be prepared with reduced costs.

On the other hand, when the silica membrane 1 is formed on titania having pore diameters of 20 nm or more, owing to the unevenness of the surface, a silica layer constitutes a thick membrane in order to cover the whole surface with the silica membrane 1, thereby resulting in a low flux. Owing to the unevenness of the surface, the silica membrane 1 becomes non-uniform, and defects such as cracks are easily generated. That is, a low separation performance is obtained. Furthermore, to prevent the generation of the cracks, an only thin membrane is formed once. The number of steps increases, and hence the costs increase.

In a case where the titania UF membrane 14 is used as a base for the formation of the silica membrane 1 and the silica membrane 1 is formed on the titania UF membrane 14 to constitute a structure in which silica infiltrates the titania UF membrane 14, influences of the unevenness of the MF membrane are reduced, and the silica membrane 1 having less defects, that is, the silica membrane 1 having a high separability can be formed.

Figure 2:
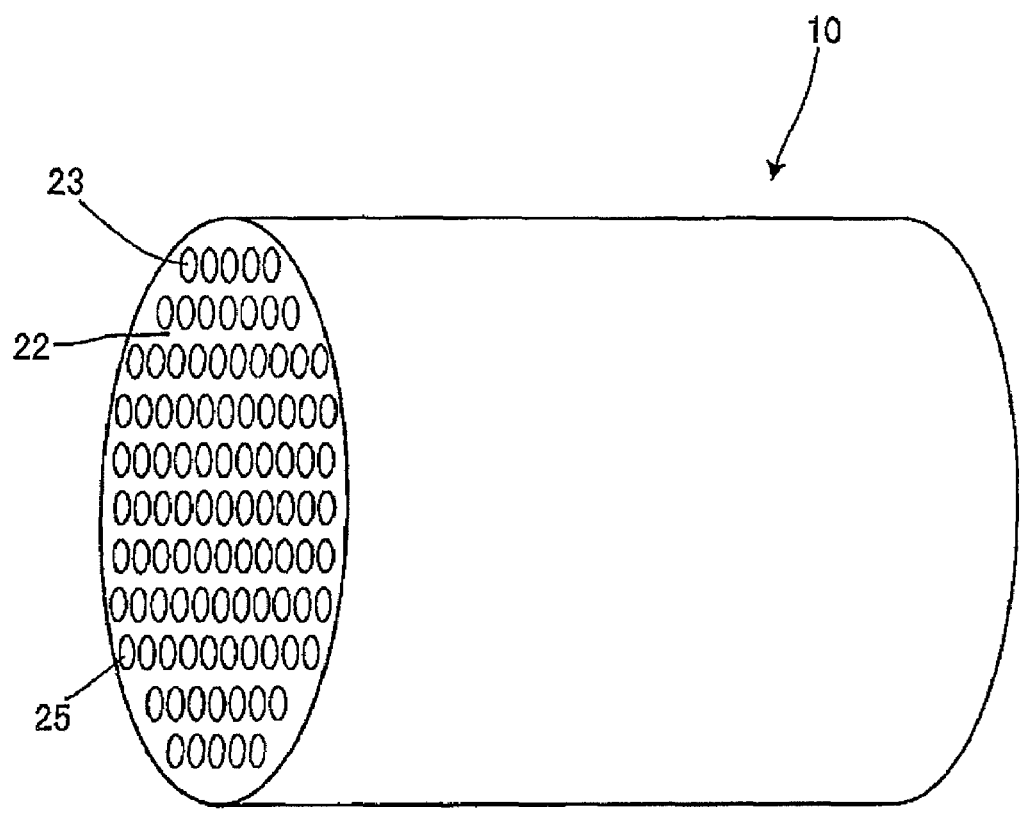
FIG. 2 is a perspective view showing a ceramic filter according to one embodiment of the present invention.

Next, one embodiment of a ceramic filter 10 in which the silica membrane 1 is formed according to the present invention will be described with reference to FIG. 2. The ceramic filter 10 of the present invention has a monolith shape including a plurality of cells 23 defined by partition walls 22 to form channel passages in an axial direction. In the present embodiment, the cells 23 have a circular section, and the silica membrane 1 shown in FIG. 1 is formed on an inner wall surface of each of the cells. The cells 23 may be formed so as to have a hexagonal or quadrangular section. According to such a structure, for example, when a mixture (e.g., water and acetic acid) is introduced into the cells 23 from an inlet-side end surface 25, one of constituting elements of the mixture is separated at the silica membrane 1 formed on an inner wall of each cell 23, transmitted through the porous partition walls 22 and discharged from an outermost wall of the ceramic filter 10, so that the mixture can be separated. That is, the silica membrane 1 formed in the ceramic filter 10 can be used as a separation membrane, and has a high separation characteristic with respect to water and acetic acid.

The porous base member 11 which is a base main body is formed as a columnar monolith-type filter element formed of a porous material by extrusion or the like. As the porous material, for example, alumina can be used, because this material has a resistance to corrosion, pore diameters of a filtering portion scarcely change even with a temperature change and a sufficient strength can be obtained. However, instead of alumina, a ceramic material such as cordierite, mullite or silicon carbide may be used.

Since the silica membrane 1 of the present invention is formed on an inner peripheral surface (the inner wall surface) of the porous base member 11, a comparatively long cylindrical base having a length of 50 cm or more, or a porous base member having a lotus-root-like shape can preferably be used.

Moreover, the titania UF membrane 14 is formed on the porous base member 11, and the silica membrane 1 is formed on the titania UF membrane 14. That is, an ultrafiltration membrane (the UF membrane) is formed on at least a silica membrane 1 forming surface of the base formed of the porous material. It is preferable to form, as the ultrafiltration membrane, a titania membrane which inhibits generation of particles or polymers in a range of 0.1 μm to 2 nm. It is assumed that an average pore diameter of the titania membrane is smaller than that of the porous material.

Next, a method of manufacturing the silica membrane 1 will be described with reference to FIG. 3. First, a coating liquid (a silica sol liquid) 40 for forming the silica membrane 1 is prepared. To prepare the coating liquid 40, tetraethoxy silane is hydrolyzed in the presence of nitric acid to form a sol liquid, and the sol liquid is diluted with ethanol. The liquid may be diluted with water instead of ethanol.

Figure 3:
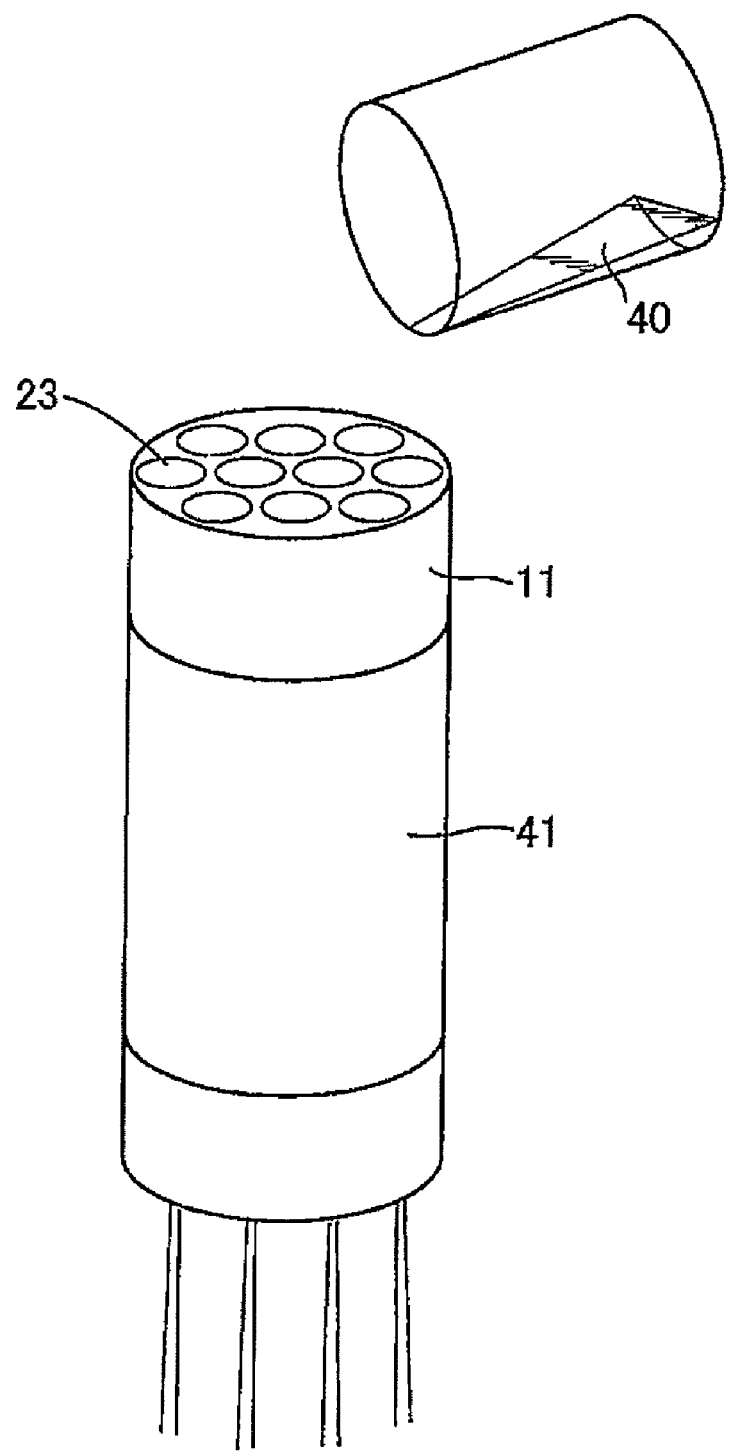
FIG. 3 is a schematic diagram schematically showing one example of a method of manufacturing a silica membrane of the ceramic filter according to the present invention.

Next, as shown in FIG. 3, an outer peripheral surface of the porous base member 11 provided with the titania UF membrane 14 is sealed with a masking tape 41. The porous base member 11 is fixed to, for example, a lower end of a wide-mouthed rotor (not shown), and the coating liquid (the silica sol liquid) 40 is passed through the cells 23 from an upper portion of the base. Alternatively, instead of this process, a membrane formation process by usual dipping may be used. Subsequently, a temperature is raised at a ratio of 100° C./hr, retained at 500° C. for one hour, and then lowered at a ratio of 100° C./hr. Operations such as the passing of the coating liquid (the silica sol liquid) 40, drying, temperature raising and temperature lowering are repeated three to five times.

Figure 4A:
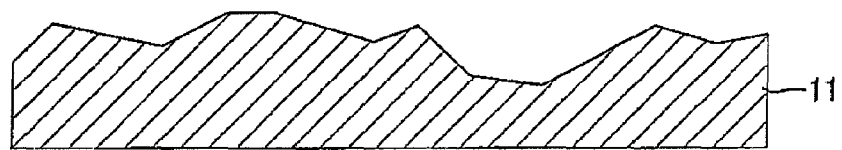
FIGS. 4(a)(b)(c) are explanatory views of a silica membrane in a case where a titania UF membrane is formed.
Figure 4B:
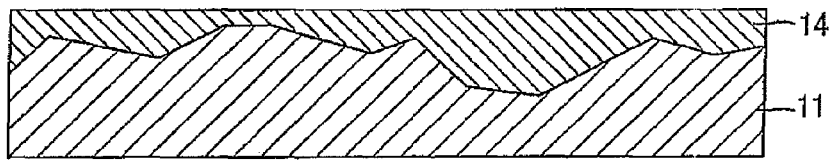
Figure 4C:
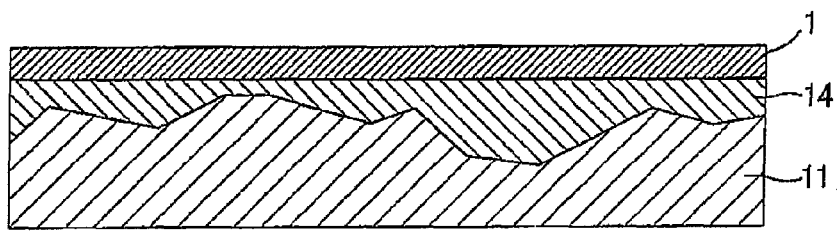

According to the above steps, the silica membrane 1 is formed on the titania UF membrane 14. That is, as shown in FIG. 4(b), the titania UF membrane 14 is formed on the porous base member 11 shown in FIG. 4(a). In consequence, influences of the unevenness of the surface of the porous base member 11 are reduced by the titania UF membrane 14. Therefore, as shown in FIG. 4(c), the silica membrane can be formed as a thin membrane having less defects. That is, the silica membrane 1 having a high flux and a high separability can be formed with reduced costs.

Figure 5A:
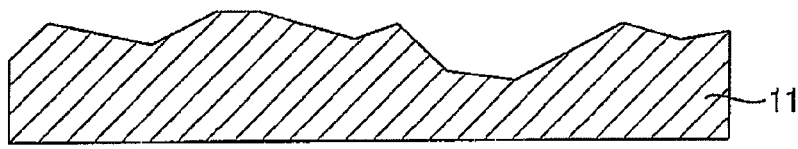
FIGS. 5(a) to 5(e) are explanatory views of a silica membrane in a case where any titania UF membrane is not formed.
Figure 5B:
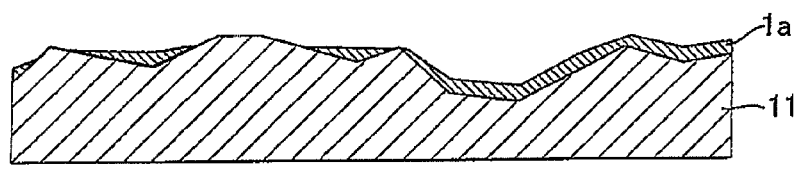
Figure 5C:
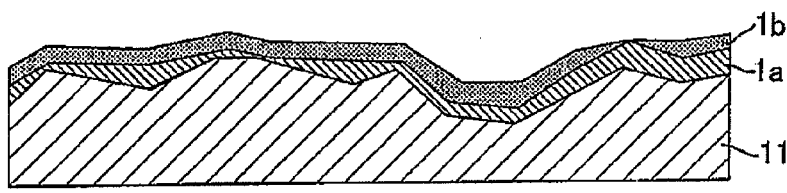
Figure 5D:
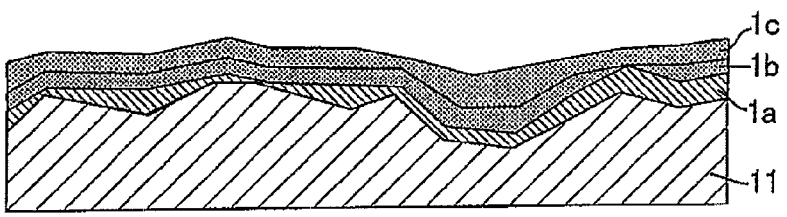
Figure 5E:
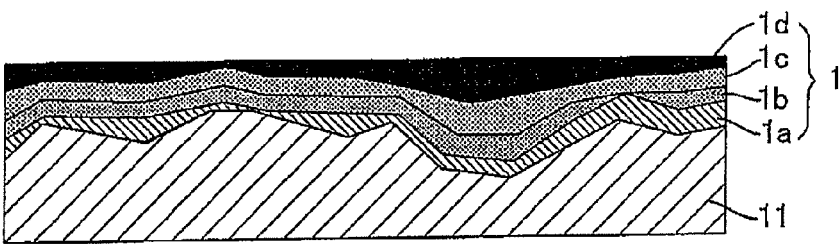

On the other hand, in a case where the silica membrane 1 is directly formed on the surface of the porous base member 11 shown in FIG. 5(a), even when a silica membrane 1a is formed as shown in FIG. 5(b), the whole surface cannot be covered, and cracks are easily generated in the silica membrane 1 owing to unevenness. As shown in FIGS. 5(c) to 5(e), when silica membranes 1b, 1c and 1d are superimposed to form a thick membrane, the silica membrane 1 can be flattened, but in this case, a low flux results. Since the number of the steps increases, the costs increase.

Figure 6A:
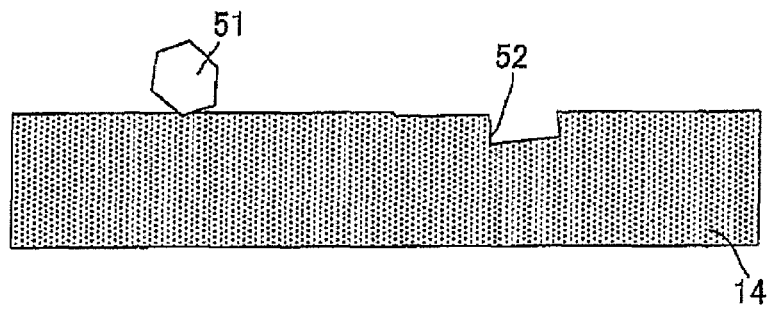
FIGS. 6(a)(b)(c) are explanatory views of formation of the silica membrane at a defective membrane.
Figure 6B:
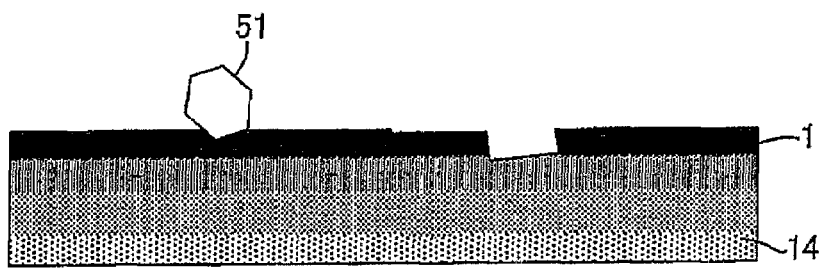

Characteristics of a case where silica of the silica membrane 1 infiltrates the titania UF membrane 14 will be described with reference to FIGS. 6(a)(b)(c). As shown in FIG. 6(a), in a case where there is a foreign matter 51 on the titania UF membrane 14 and a structure in which the silica membrane 1 infiltrates the titania UF membrane 14 as shown in FIG. 6(b) is formed, even when there are foreign matters and defects, the silica membrane 1 infiltrates so as to cover the titania UF membrane 14. Even when the titania UF membrane 14 has a hole 52, the silica membrane 1 is formed so as to cover the hole 52. A structure in which the surface of the titania UF membrane 14 is covered with the silica membrane 1 can be obtained. That is, a foreign matter trace defect and a hole defect can be repaired by the silica membrane 1.

Figure 6C:
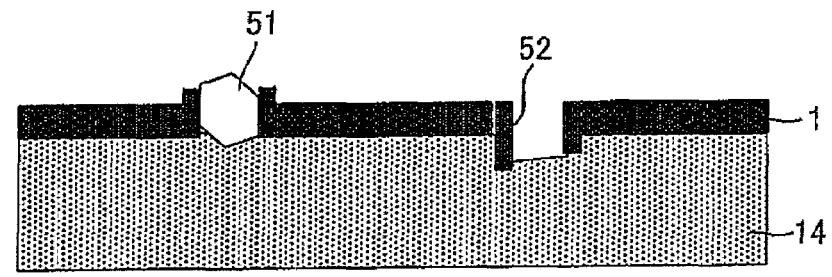

On the other hand, as shown in FIG. 6(c), in a structure in which the silica membrane 1 does not infiltrate the titania UF membrane 14, when the titania UF membrane 14 has the foreign matter defect, the corresponding portion is not covered with the silica membrane 1. Even when the titania UF membrane 14 has the hole defect, the silica membrane 1 is not easily formed at a portion of the hole 52, and a portion where the surface of the titania UF membrane 14 is not covered with the silica membrane 1 is easily generated.

The ceramic filter 10 obtained as described above and including the nano-level thin-membrane-like silica membrane 1 formed on the inner wall surface thereof can preferably be used as a filter which separates a mixed liquid or the like. It is to be noted that when the cells 23 are submerged into acetic acid or acetic acid is passed through the cells, a separation coefficient can be improved. In the above embodiment, the case where the silica membrane is formed as the ceramic porous membrane has been described, but the present invention is not limited to this embodiment, and a titania membrane, a zirconia membrane, a zeolite membrane or the like may be formed.

EXAMPLES

A manufacturing method of the present invention will hereinafter be described in accordance with examples in more detail, but the present invention is not limited to these examples. First, a porous base member, a ceramic sol liquid, a membrane forming method and the like used in the present example will be described.

Example 1

(1) Porous Base Member

A material provided with an alumina membrane having an average pore diameter of 0.2 μm and having a monolith shape (an outer diameter of 30 mm, a cell inner diameter 3 mm×37 cells and a length of 500 mm) was used as a base. It is to be noted that opposite end portions of the base were sealed with glass. The average pore diameter of the base was measured based on an air flow process described in ASTM F306.

(2) Titania Sol Liquid

Titanium isopropoxide was hydrolyzed in the presence of nitric acid to obtain a titania sol liquid. A sol particle diameter measured by a dynamic optical scattering process was 100 nm.

(3) Titania UF Membrane Formation

The titania sol liquid was diluted with water to obtain a sol liquid for membrane formation. The liquid was circulated through base cells to come in contact with the cells, whereby the membrane was formed in the cells.

(4) Drying, Firing

After a sample was dried, the sample was thermally treated at 500° C. This sample was used as a titania UF base provided with the titania UF membrane. When pore diameters of the titania UF base were measured, an average pore diameter was 8 nm. A measurement principle of the pore diameters is the same as that of the method described in Non-Patent Document 1, but in the Non-Patent Document 1, water vapor and nitrogen were used, whereas in the measurement method used in the present invention, n-hexane and nitrogen were used.

(5) Silica Sol Liquid

Tetraethoxy silane was hydrolyzed in the presence of nitric acid to obtain a silica sol liquid. The silica sol liquid was diluted with ethanol, and regulated into 0.7 wt % in terms of silica to prepare a sol liquid for membrane formation.

(6) Membrane Formation

An outer peripheral surface of the sample (the porous base member) was sealed with a masking tape. The porous base member was fixed to a lower end of a wide-mouthed rotor, and 60 ml of silica sol liquid was passed through the cells from an upper portion of the base. It was confirmed that the membrane was formed on the whole inner wall by this membrane formation step.

(7) Drying

The porous base member through which a silica sol was passed was dried at 30° C. for 2 hr on a condition of a humidity of 50%.

(8) Firing

A temperature was raised at a ratio of 100° C./hr, retained at 500° C. for one hour and lowered at the ratio of 100° C./hr. It is to be noted that the operations of (6) to (8) were repeated three to five times to obtain Example 1.

Comparative Example 1

A titania UF membrane was formed in the same manner as in the membrane formation of Example 1, but a sample was thermally treated at 400° C. This sample was used as a titania UF base provided with the titania UF membrane. When pore diameters of the titania UF base were measured, an average pore diameter was 2 nm. This base was subjected to silica sol membrane formation of (5) to (8).

Comparative Example 2

A titania UF membrane was formed in the same manner as in the membrane formation of Example 1, but a sample was thermally treated at 700° C. This sample was used as a titania UF base provided with the titania UF membrane. When pore diameters of the titania UF base were measured, an average pore diameter was 40 nm. This base was subjected to silica sol membrane formation of (5) to (8).

Comparative Example 3

In the membrane formation of Example 1, any titania UF membrane was not formed, and an alumina porous base member was directly subjected to silica sol membrane formation of (5) to (8).

In Example 1 and Comparative Example 1, an infiltration depth into titania UF was measured. In Example 1, a portion in which a silica/titania oxide weight ratio according to EDX element analysis was 0.2 or more reached ¾ of a UF thickness from the outermost surface of the UF membrane. Therefore, an infiltration structure could be confirmed. In Comparative Example 1, a portion in which a silica/titania oxide weight ratio according to EDX element analysis was 0.2 or more stayed at 1/10 of a UF thickness from the outermost surface of the UF membrane. Therefore, it could be confirmed that any infiltration structure was not obtained.

In Comparative Examples 2, 3, when a membrane was formed using a membrane formation sol liquid having a silica concentration of 0.7 wt %, cracks were generated in the membrane surface, and any membrane could not be formed. Therefore, in Comparative Example 2, a membrane was formed with 0.3 wt %, but cracks were generated. Furthermore, a membrane was formed with 0.1 wt %, the cracks were reduced, and membranes were formed 20 times. In Comparative Example 3, the cracks were reduced at 0.3 wt %, and membranes were formed seven times. However, in either case, it was recognized that micro cracks were left in the membrane surface, and any sound membrane could not be formed.

Figure 7:
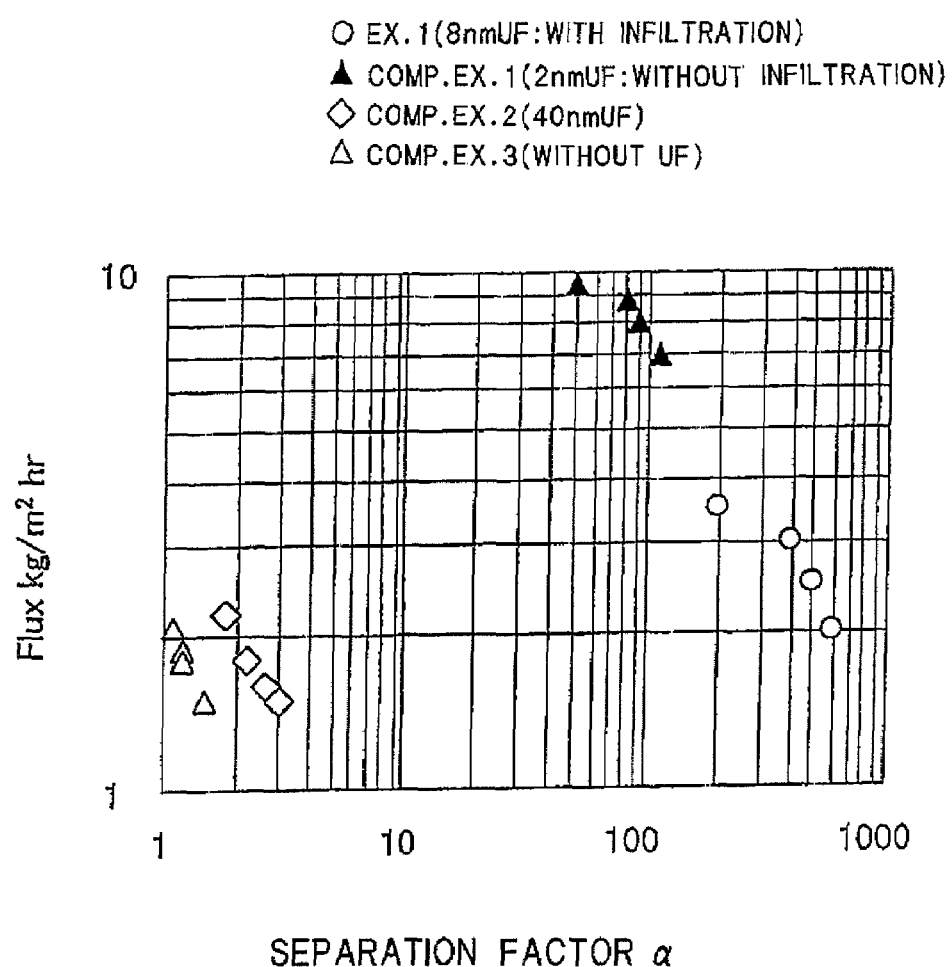
FIG. 7 is a diagram showing a flux with respect to a separation coefficient.

In Example 1 and Comparative Examples 1, 2 and 3, a permeation evaporating separation test was conducted for two hours. In the test, 90% ethanol was circulated through monolith cells at 70° C. and a liquid flow rate of 10 L/min, and the outside of monolith was evacuated in a range of 2 to 10 Pa. The sampling was performed four times every 30 minutes. As results of the separation tests of Example 1 and Comparative Examples 1 to 3, a relation between a separation coefficient and a flux is shown in FIG. 7.

Example 1 indicated a high α (a separation coefficient) as compared with Comparative Example 1, and indicated a high α and a high flux as compared with Comparative Examples 2, 3. In Comparative Examples 2, 3, to form the membrane surface without any crack, a slurry having a small silica concentration as compared with the example needs to be used. As a result, the number of membrane formation times increases. When the number of the membrane formation times increases, steps lengthen, and costs increase.

As described above, when the titania UF membrane is formed on the MF membrane and the silica membrane is formed on the titania UF membrane, a silica dehydration membrane having a high performance can be obtained with reduced costs. The structure in which silica infiltrates titania UF is constituted, and hence a higher separation coefficient can be developed.

According to the present invention, a thin and uniform membrane having less coarse and large pores and less defects can be obtained with less membrane formation times. Therefore, a ceramic filter provided with such a silica membrane can preferably be used as a filter. A ceramic filter including a nano-level thin-membrane-like silica membrane formed on the inner wall surface thereof can be used in a portion where an organic filter cannot be used, for example, separation removal or the like in an acidic or alkaline solution or an organic solvent.

What is claimed is:

1. A ceramic porous membrane comprising:
    an ultrafiltration membrane made of titania having an average pore diameter of 8 to 20 nm; and
    a ceramic porous membrane formed on the ultrafiltration membrane, wherein the ceramic porous membrane partially permeates pores of the ultrafiltration membrane to a depth of one-half or more of a thickness of the ultrafiltration membrane from the outermost surface of the ultrafiltration membrane.

2. The ceramic porous membrane according to claim 1, wherein the ceramic porous membrane is a silica membrane.

3. The ceramic porous membrane according to claim 1, wherein the ceramic porous membrane is deposited on a surface of the ultrafiltration membrane as a ceramic sol that permeates the ultrafiltration membrane and then solidifies.

4. A ceramic porous filter comprising:
    a porous base member;
    an ultrafiltration membrane comprising titania formed on the porous base member and having an average pore diameter of 8 to 20 nm; and
    a ceramic porous membrane formed on the ultrafiltration membrane, wherein the ceramic porous membrane partially permeates pores of the ultrafiltration membrane to a depth of one-half or more of a thickness of the ultrafiltration membrane from the outermost surface of the ultrafiltration membrane.

5. The ceramic filter according to claim 4, wherein the ceramic porous membrane is a silica membrane.

6. The ceramic filter according to claim 4, wherein the ceramic porous membrane is deposited on a surface of the ultrafiltration membrane as a ceramic sol that permeates the ultrafiltration membrane and then solidifies.

* * * * *

UNITED STATES PATENT AND TRADEMARK OFFICE
CERTIFICATE OF CORRECTION

PATENT NO. : 7,717,272 B2
APPLICATION NO. : 11/850692
DATED : May 18, 2010
INVENTOR(S) : Manabu Isomura et al.

It is certified that error appears in the above-identified patent and that said Letters Patent is hereby corrected as shown below:

Title Page, Item (56), References Cited, Other publications:
*please add* "Tsuru et al., "Silica-zirconia membranes for nanofiltration," Journal of Membrane Science 149 (1998) pg. 127-135"

Signed and Sealed this

Nineteenth Day of October, 2010

David J. Kappos
*Director of the United States Patent and Trademark Office*